UNITED STATES PATENT OFFICE.

CHARLES WARNER AND IRVING WARNER, OF WILMINGTON, DELAWARE.

METHOD OF HYDRATING DOLOMITIC OR MAGNESIAN LIME.

1,284,505.         Specification of Letters Patent.         Patented Nov. 12, 1918.

No Drawing.         Application filed July 10, 1914.   Serial No. 850,226.

*To all whom it may concern:*

Be it known that we, (1) CHARLES WARNER and (2) IRVING WARNER, citizens of the United States, residing at Wilmington, in the county of New Castle and State of Delaware, have invented certain new and useful Improvements in Methods of Hydrating Dolomitic or Magnesian Lime, of which the following is a specification.

Our invention relates to a process of hydrating dolomitic or magnesian quick-lime (by which is meant lime containing more than five per cent. of magnesium oxid) and has for its object to secure, as far as possible, the hydration of a material part or all of the magnesium oxid, in addition to the hydration of all the calcium oxid in order to secure additional strength in mortars made from such hydrated limes. A further object is to maintain the plasticity and free working under the trowel of mortar made from magnesian limes.

In carrying out our process, the hydration of the dolomitic or magnesian quick-lime may be effected by confining it in a closed vessel, and adding sufficient water to chemically satisfy the calcium oxid and a material proportion of the magnesium oxid. The heat of reaction produced by the hydration of the lime, generates steam and under the combined effect of the water and steam under pressure, a material part (*e. g.* 50%) or even all the magnesia may be hydrated.

The process may also be carried out in two stages, the first stage consisting in hydrating the dolomitic or magnesian quick-lime, comminuted preferably to coarse pulverization, by the addition of only sufficient water to effect the hydration of the calcium oxid. This hydration is effected preferably at atmospheric pressure and under such conditions as to avoid any unnecessary rise in temperature, as the hydration of lime at high temperature has a tendency to produce a crystallized condition which diminishes the plasticity of the mortar, while hydration at low temperatures conduces to the production of a colloidal hydrate which is plastic and freeworking under the trowel. The second stage of the process consists in subjecting the lime-hydrated mixture, either immediately or after a convenient interval to the further action of water and steam, by introducing the dolomitic hydrate into closed vessels where the hydration of the magnesium oxid is effected by further contact with water, in the presence of steam, under a maintained pressure. A material part of the magnesia of the dolomitic or magnesian quick-lime may be hydrated by the use of nominal or low pressures such as from slightly above atmospheric pressure to 10 or 15 pounds; for the hydration of larger percentages of the magnesium oxid in limes of this character, much higher pressures may be used.

We claim:

The process of hydrating magnesia-containing quick-lime which consists in first adding water sufficient to hydrate the calcium oxid while at atmospheric pressure, and then effecting the hydration of the magnesium oxid in a closed vessel and under maintained pressure by further contact with water.

In testimony whereof, we affix our signatures in presence of two witnesses.

CHARLES WARNER.
IRVING WARNER.

Witnesses:
W. C. SMITH,
R. DINSMORE.